United States Patent
Rowoldt

(10) Patent No.: US 11,762,716 B2
(45) Date of Patent: Sep. 19, 2023

(54) AUTOMATIC ANIMATION SYSTEM AND METHOD

(71) Applicant: Jason Michael Rowoldt, Dublin, OH (US)

(72) Inventor: Jason Michael Rowoldt, Dublin, OH (US)

( * ) Notice: Subject to any disclaimer, the term of this patent is extended or adjusted under 35 U.S.C. 154(b) by 151 days.

(21) Appl. No.: 17/572,049

(22) Filed: Jan. 10, 2022

(65) Prior Publication Data

US 2023/0222015 A1    Jul. 13, 2023

(51) Int. Cl.
| | | |
|---|---|---|
| G06F 3/00 | (2006.01) | |
| G06F 9/54 | (2006.01) | |
| G06F 9/451 | (2018.01) | |
| G06F 40/18 | (2020.01) | |
| G06F 40/186 | (2020.01) | |
| G06F 3/0486 | (2013.01) | |

(52) U.S. Cl.
CPC ............ *G06F 9/543* (2013.01); *G06F 3/0486* (2013.01); *G06F 9/451* (2018.02); *G06F 40/18* (2020.01); *G06F 40/186* (2020.01)

(58) Field of Classification Search
CPC ...................................... G06F 9/541
USPC .......................................... 719/328
See application file for complete search history.

(56) References Cited

U.S. PATENT DOCUMENTS

| | | | |
|---|---|---|---|
| 11,120,528 B1* | 9/2021 | Seely | G06T 5/002 |
| 2014/0277735 A1* | 9/2014 | Breazeal | B25J 9/0003 |
| | | | 700/259 |
| 2017/0061003 A1* | 3/2017 | Baird | H04N 21/4825 |
| 2019/0182371 A1* | 6/2019 | Ashall | H04M 1/72469 |
| 2019/0304157 A1* | 10/2019 | Amer | G06V 40/23 |
| 2020/0320764 A1* | 10/2020 | Bryson | G06F 9/451 |
| 2020/0412133 A1* | 12/2020 | Baldasare | G06V 40/172 |

OTHER PUBLICATIONS

Kerry Shih-Ping, Creating Interactive Web Data Applications with Spreadsheets. (Year: 2014).*

\* cited by examiner

*Primary Examiner* — Lechi Truong
(74) *Attorney, Agent, or Firm* — Fresh IP PLC; John R. Bednarz

(57) ABSTRACT

A system includes a memory storing computer-readable instructions and at least one processor to execute the instructions to receive a shot sheet comprising data and metadata associated with an animation project, parse the shot sheet to generate instructions associated with at least one shot in the animation project, send the instructions to an animation program using an application programming interface (API), generate the animation project based on the instructions using the animation program, render the animation project into a video, and store the video in a database and generate a uniform resource locator (URL) for the video.

18 Claims, 8 Drawing Sheets

FIG. 7

AUTOMATIC ANIMATION SYSTEM AND METHOD

BACKGROUND

It is extremely difficult for a novice to generate an animation video or project. Many software packages and systems are so complex and complicated that it can take thousands of hours and years to understand how to use the system. In addition, there are multiple software packages and systems and each software package or system is completely different. There are very large teams that work together to generate animation for studios that create movies, television shows, and video games. As a result, it is expensive both financially and computationally and a very time consuming process. This can make it impractical or even impossible for novices, small teams, or individuals to compete with the large teams that have vast computational power, technical know-how, and large numbers of skilled, technical artists.

It is with these issues in mind, among others, that various aspects of the disclosure were conceived.

SUMMARY

The present disclosure is directed to an automatic animation system and method. The system may include a client computing device that communicates with a server computing device to generate an animation file using an automatic animation program. A user may utilize a graphical user interface (GUI) provided by the automatic animation program to create a shot sheet. The shot sheet may be based on a plurality of available shot sheet templates that may be used to create animations, objects, sounds, and others. The shot sheet may include one or more acts, one or more scenes, one or more subscenes, and one or more shots.

The shot sheet may be received by a shot sheet parser to parse each line of the shot sheet and generate instructions that are associated with a particular animation program. The instructions may be sent to the particular animation program using an application programming interface (API). The animation program may generate an animation project and render the animation project to generate an animation file that may include one or more shots along with synchronized video and audio. The server computing device may store the animation file in a database and may generate a unique uniform resource locator (URL) for the video file. The server computing device may send the URL to the client computing device.

In one example, a system may include a memory storing computer-readable instructions and at least one processor to execute the instructions to receive a shot sheet comprising data and metadata associated with an animation project, parse the shot sheet to generate instructions associated with at least one shot in the animation project, send the instructions to an animation program using an application programming interface (API), generate the animation project based on the instructions using the animation program, render the animation project into a video, and store the video in a database and generate a uniform resource locator (URL) for the video.

In another example, a method may include receiving, by at least one processor, a shot sheet comprising data and metadata associated with an animation project, parsing, by the at least one processor, the shot sheet to generate instructions associated with at least one shot in the animation project, sending, by the at least one processor, the instructions to an animation program using an application programming interface (API), generating, by the at least one processor, the animation project based on the instructions using the animation program, rendering, by the at least one processor, the animation project into a video, and storing, by the at least one processor, the video in a database and generating a uniform resource locator (URL) for the video.

In another example, a non-transitory computer-readable storage medium may have instructions stored thereon that, when executed by a computing device cause the computing device to perform operations, the operations including receiving a shot sheet comprising data and metadata associated with an animation project, parsing the shot sheet to generate instructions associated with at least one shot in the animation project, sending the instructions to an animation program using an application programming interface (API), generating the animation project based on the instructions using the animation program, rendering the animation project into a video, and storing the video in a database and generating a uniform resource locator (URL) for the video.

These and other aspects, features, and benefits of the present disclosure will become apparent from the following detailed written description of the preferred embodiments and aspects taken in conjunction with the following drawings, although variations and modifications thereto may be effected without departing from the spirit and scope of the novel concepts of the disclosure.

BRIEF DESCRIPTION OF THE DRAWINGS

The accompanying drawings illustrate embodiments and/or aspects of the disclosure and, together with the written description, serve to explain the principles of the disclosure. Wherever possible, the same reference numbers are used throughout the drawings to refer to the same or like elements of an embodiment, and wherein:

FIG. 7 shows a shot sheet to be parsed by the automatic animation application of the automatic animation system according to an example of the instant disclosure.

DETAILED DESCRIPTION

Figure 1:
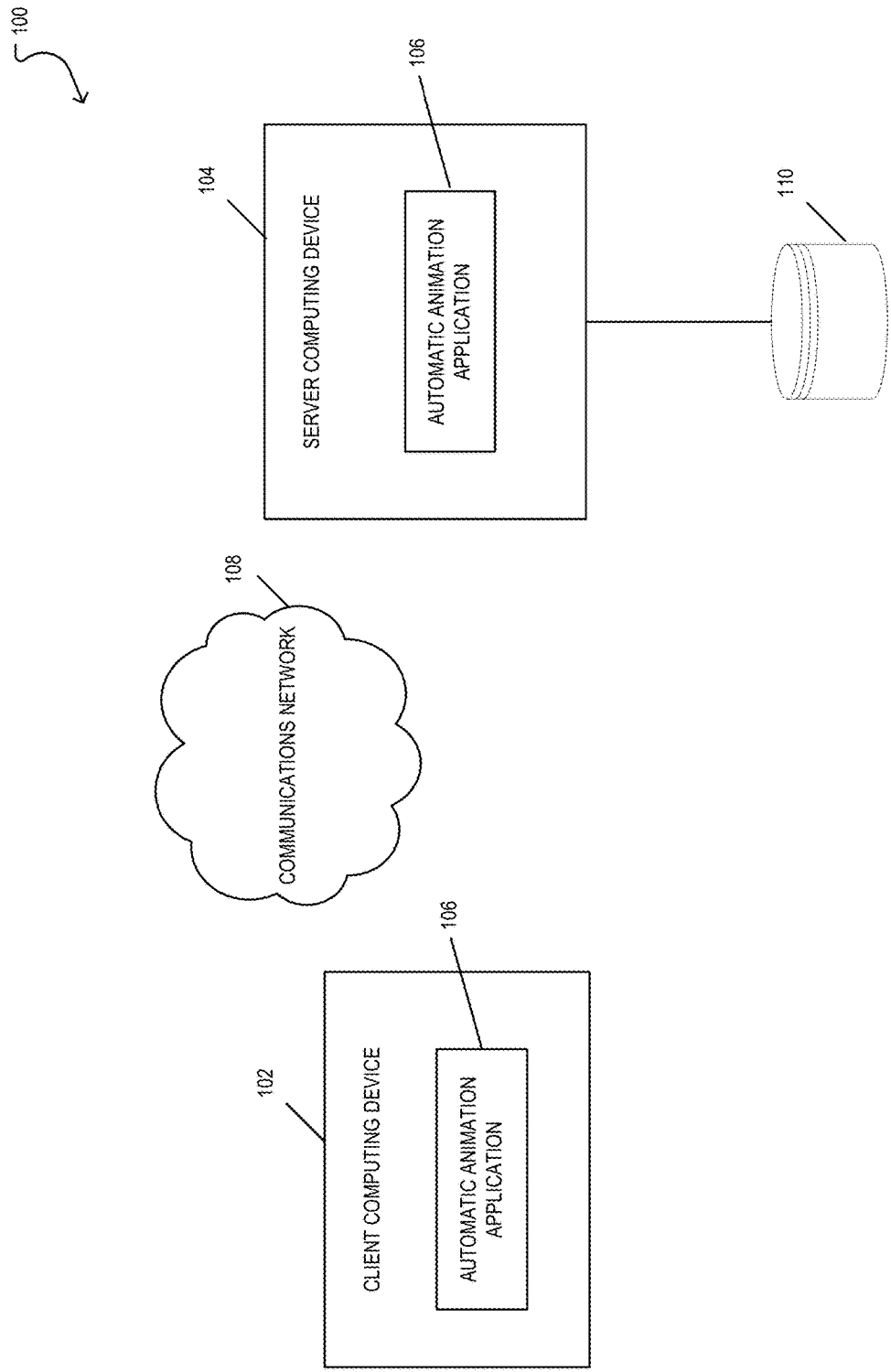
FIG. 1 is a block diagram of an automatic animation system according to an example of the instant disclosure.

The present invention is more fully described below with reference to the accompanying figures. The following description is exemplary in that several embodiments are described (e.g., by use of the terms "preferably," "for example," or "in one embodiment"); however, such should not be viewed as limiting or as setting forth the only embodiments of the present invention, as the invention encompasses other embodiments not specifically recited in this description, including alternatives, modifications, and equivalents within the spirit and scope of the invention. Further, the use of the terms "invention," "present invention," "embodiment," and similar terms throughout the description are used broadly and not intended to mean that the invention requires, or is limited to, any particular aspect being described or that such description is the only manner in which the invention may be made or used. Additionally, the invention may be described in the context of specific applications; however, the invention may be used in a variety of applications not specifically described.

The embodiment(s) described, and references in the specification to "one embodiment", "an embodiment", "an example embodiment", etc., indicate that the embodiment(s) described may include a particular feature, structure, or characteristic. Such phrases are not necessarily referring to the same embodiment. When a particular feature, structure, or characteristic is described in connection with an embodiment, persons skilled in the art may effect such feature, structure, or characteristic in connection with other embodiments whether or not explicitly described.

In the several figures, like reference numerals may be used for like elements having like functions even in different drawings. The embodiments described, and their detailed construction and elements, are merely provided to assist in a comprehensive understanding of the invention. Thus, it is apparent that the present invention can be carried out in a variety of ways, and does not require any of the specific features described herein. Also, well-known functions or constructions are not described in detail since they would obscure the invention with unnecessary detail. Any signal arrows in the drawings/figures should be considered only as exemplary, and not limiting, unless otherwise specifically noted. Further, the description is not to be taken in a limiting sense, but is made merely for the purpose of illustrating the general principles of the invention, since the scope of the invention is best defined by the appended claims.

It will be understood that, although the terms "first," "second," etc. may be used herein to describe various elements, these elements should not be limited by these terms. These terms are only used to distinguish one element from another. Purely as a non-limiting example, a first element could be termed a second element, and, similarly, a second element could be termed a first element, without departing from the scope of example embodiments. As used herein, the term "and/or" includes any and all combinations of one or more of the associated listed items. As used herein, the singular forms "a", "an," and "the" are intended to include the plural forms as well, unless the context clearly indicates otherwise. It should also be noted that, in some alternative implementations, the functions and/or acts noted may occur out of the order as represented in at least one of the several figures. Purely as a non-limiting example, two figures shown in succession may in fact be executed substantially concurrently or may sometimes be executed in the reverse order, depending upon the functionality and/or acts described or depicted.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Creating a media project or an animation project or video is an extremely expensive and time consuming process. It may necessitate a large financial commitment as well as utilize vast computational resources. As an example, a Hollywood studio or a video game studio may have a large team of animators with vast technical knowledge. Each studio may utilize one or more different software systems or packages. In some situations, there may be technological lock-in because the more that the studio continues to adopt and use the software systems or packages, they continue to remain popular. However, they are very expensive and can be difficult to learn to use.

Creating an animation project has conventionally been enormously expensive both financially and computationally. In addition, it is extremely time consuming to create a project and make even minor changes. Each software system or package may have an application programming interface (API) that may be used to accomplish repetitive tasks or create specialized add-on modules. As an example, BLENDER 3D has a Python API. Rather than creating add-ons, the API may be utilized to generate and control an animation project without a user having to learn how to use the animation software. The user can avoid learning how to utilize the animation software and spending the countless hours using the software to generate an animation. Rather, the user may automatically generate an animation project or video using the system discussed herein. The system may automatically generate animation projects or files with or without human intervention based on an input, which may be a shot sheet. The shot sheet may be generated based on artificial intelligence (AI) and/or a neural network.

Aspects of an automatic animation system and method includes a client computing device that communicates with a server computing device to generate an animation file using an automatic animation program. A user may utilize a graphical user interface (GUI) provided by the automatic animation program to create a shot sheet. The shot sheet may be based on a plurality of available shot sheet templates that may be used to create animations, objects, sounds, and others. The shot sheet may include one or more acts, one or more scenes, one or more subscenes, and one or more shots. The shot sheet may be received by a shot sheet parser to parse each line of the shot sheet and generate instructions that are associated with a particular animation program. The instructions may be sent to the particular animation program using an application programming interface (API). The animation program may generate an animation project and render the animation project to generate an animation file that may include synchronized video and audio. The server computing device may store the animation file in a database and may generate a unique uniform resource locator (URL) for the video file. The server computing device may send the URL to the client computing device.

The system may receive information associated with a screenplay. The screenplay may be organized in an established format and be used to generate a shot sheet for use with the automatic animation system. In one example, the system may utilize a natural language parser (NPL) to generate a shot sheet based on the screenplay.

The automatic animation system generates and uses the shot sheet. A shot sheet can be a comma separated values file, e.g., a .csv file, or a spreadsheet file. The shot sheet may be parsed by a shot sheet parser one line at a time. The shot sheet may be created manually, may be generated based on the screenplay using NPL, or may be created using a graphical user interface (GUI) associated with the automatic animation system. The shot sheet may include data and metadata including information associated with an animation project. The data may include a title, a rendering type, an author, a frames per second (FPS) value of an associated video, character names and models (e.g., cast information), and shot information.

A shot sheet may have a structure, format, or syntax that may be used by the shot sheet parser to interpret the shot sheet. The shot sheet may be divided into parts or sections including one or more acts, one or more scenes, one or more subscenes, and one or more shots. As an example, an animation project may have at least one act, but may have more than one act. For example, the animation project may have three acts similar to a traditional three act play. Each act may have one or more scenes. The scenes may be scenery or character set changes. Each scene may have one or more subscenes, which can be a logical grouping of shots. Each subscene may have one or more shots.

As a minimum, a shot sheet may have one act, one scene, one subscene, and one shot. Each sub level may inherit from the level above. For instance, a mood may be "Sunny" in a first act and thus a scene in act one may have a mood of "Sunny." Additionally, subscene one may inherit "Sunny" from scene one. Each shot sheet is flexible and may have a number of components or characteristics.

Shot sheets may have a variety of different variables. As an example, a mood may control lighting, a tone may control music, and a location may control a set or a collection of three-dimensional (3D) objects. A location may be generated or may be a static map that may be loaded by an animation program. Locations may be associated with a scene and/or a subscene. An actor may be a focus of a camera. There may be multiple actors/objects. If there are multiple actors, the system may frame the actors/objects intelligently. For instance, if there are two actors, the camera may allow both to be in a camera frame. If there are three actors, they all may be in the camera frame. This may change from shot to shot. There may be a set layout and this may be a location at a shot level. For instance, the location may be a farm. However, the set layout may include different parts of the location such as a barn interior, fields, sheep pens, and others.

The shot sheet may include weather, which may be visual effects that may affect scenes and/or subscenes. The shot sheet may include time of day, which may control lighting associated with the scene and/or subscene. The shot sheet may include camera information that may control camera movement including tracking, panning, angle, movement, and others. The shot sheet may include camera distance which may control framing of one or more actors. Each actor may have a focal point, which for a human character may be the face of the human character. If the camera distance is a wide shot, the camera may be placed at an appropriate distance to frame the actor or object. A close up may frame a character's face and may fill the screen.

The shot sheet may include actions that may control animation of characters as well as visual effects, physics, and others. As an example, freefall may be an action linked to a character falling through the air. The shot sheet may include poses. The poses may be one or more poses that an actor may go through during a shot. They may use keyframing or other animation methods to move between the poses. In addition, there may be static or dynamic animations such as "running and falling over" or "running."

The shot sheet may include energy that is a value that may be used in a variety of ways by the automatic animation system. As an example, energy may be used to indicate how quickly a character may be moving, how quickly the camera moves, how quickly shots change (e.g., a long, slow shot as opposed to many quick cuts), and other variables that may influence the shot. The shot sheet may include emotional state, which may be used to control facial animation and poses of the character, as well as changes in between them such as when a character goes from a smile to a frown in a same shot.

A shot sheet parser interprets data and metadata in the shot sheet for use with an animation program. The shot sheet parser may take control of an animation program and can store an animation project as a static project. The animation program may be UNITY, UNREAL, BLENDER, and MAYA, among others. The shot sheet parser may determine an animation program to be used based on information in the shot sheet (e.g., in shot sheet metadata) and may use functions associated with the animation program to place, manipulate, and store keyframe and timestamp information to be saved as an animation project, ready to be rendered. As an example, the animation program may be Blender. The shot sheet parser may parse the shot sheet line by line, create a series of shots in the animation program, and save the series of shots as a .blend file or a different type of file.

Each animation program may be used to generate a file in a different way, but may result in a project to be rendered, using at least the animation program. The file also may be rendered using outside rendering services or a stand alone renderer. Sound effects may or may not be present in the animation file. Some animation programs have the ability to add speakers in various locations that may play sounds. As an example, a bowling ball bouncing down a set of wooden stairs may be captured by a physics engine and the resulting sounds may be added in the renderer. Typically, the shot sheet parser may generate an animation file in a number of seconds.

As an example, instructions are shown below as generated by the shot sheet parser to generate an exploding planet animation file and may be sent to an animation program using the API.

1    bpy.ops.mesh.primitive_uv_sphere_add(size=1, view_align=False, enter_editmode=False, location=(x y, z)
2 bpy.ops.object.particle_system_add( )
3 bpy.data.particles["ParticleSettings"].effector_weights.gravity=0
4    bpy.ops.object.quick_explode(frame_start=n, frame_end=m)

Line 1 adds a sphere.
Line 2 indicates to the animation program that a particle system is used.
Line 3 indicates to the animation program that it is in in space, i.e., gravity is 0 (so the pieces of the planet will scatter, not drop down to the "ground".
Line 4 explodes the sphere.

The instructions above may be used to generate a function named "quick planet explode." The variables may be populated based on a length of the shot and an intended location of the actor, e.g., the planet. Each animation program may have commands such as the above example that may be grouped into logical functions. The functions may be used in combination with information from the shot sheet and logic from the shot sheet parser to create individual shots. When the shot sheet parser generates the lines above, it may add lighting conditions. If the location is set to "space", the sun may be added as a light source.

The animation program may generate an animation project. This is the result of the shot sheet parser. The animation project is generally represented by a file that may be opened using the animation program such as a .blend file that may be a 3D image or animation project that may have been created using the animation program. The .blend file may include mesh data, lighting information, vertex painting, animation keyframes, NURBS objects, procedural textures, uvmapping layout, and realtime interactivity data. .blend files may store multiple scenes and/or subscenes having the one or more shots in the single file.

The system may be used to supplement an existing animation studio or animation pipeline. The system may be used to make iterations of a same story in seconds. Alternatively, a user could make changes to a shot sheet and create a new animation in seconds. This may provide multiple technical advantages for a team of human animators/artists.

Rendering may be automatically accomplished by the system. The ability to automatically create the animation project and render the animation project (e.g., synchronize sounds/music with the project) may allow any user to create animations without knowing how to use the animation software or have any technical skills. Many aspects may affect rendering and this may be modified using the metadata in the shot sheet. Low quality real-time rendering associated with a video game and highly realistic computationally expensive rendering associated with a Hollywood production may be accomplished using the shot sheet. Rendering quality and speed may be chosen by the user. The change in rendering quality may determine a cost and fidelity of the animation project and the final product. As an example, a user may do a "quick render" with low polygon count and low quality visual effects, check the flow of the video, and increase the rendering to a higher quality.

In one example, a video game may be designed to run in real time as opposed to a feature length 3D animated movie. In the video game, when doing "quick render", the creators use lower quality settings such as turning off ray tracing, or using low polygon objects, or less particle effects for things such as billowing smoke. In a feature length movie, these settings are "cranked up", so raytracing may be turned on and the amount of 'bounces' may be increased, or more particle effects can be used which result in better looking, more realistic smoke. There are also certain rendering tools which are meant to be faster (in real time) versus taking a long time (in minutes, perhaps) to render one frame. The practical implementation of these different rendering methods would result in a "quality" value such as a low, medium, high, or even a numerical scale.

Sound and video synchronization is one of the last steps in the process. The system, using the graphical user interface or shot sheet information, may capture music, optional sound effects, and other things that may be in one or more shots or scenes in the shot sheet. The sound/video synchronization may occur to synch the sound files and the rendered video to add the final layer of sound for final processing and rendering the video. This is different from rendering only the animation. A completed video is created and this is the final output of the system. The video may be stored in a database and may have a unique uniform resource locator (URL). The video may be uploaded to a particular server or service and the system may send a message such as an email or a push notification with the URL. In addition, the system may transmit the video file to a streaming service, upload the video file to YOUTUBE, or distribute the video file in another way.

In one example, a user may use the graphical user interface to visually create a shot sheet. The user may use a content wizard that allows the user to name the video, name characters, define relationships, set character models, choose sets and locations, weather, music, sound effects, visual effects, and others. In addition, the user may create and select from shot templates. A user can define, share, and select from various tropes that have been created or developed by the film industry over the last one hundred years.

When a user creates a shot template, they may save the shot template for future uses or optionally share the shot template with other users of the system. A user can select one user interface element to import a type of shot or a series of shots that may make up a subscene, a scene, or even an act and may replace characters and sets with their own characters and sets. The replacement of the actors may be done by the system. For instance, if the shot in the shot template has a protagonist and an antagonist, they can be replaced with a protagonist and an antagonist of the current project. In addition, the system may be used to string shot sheet templates together for automatic media creation or automatic animation creation or combine manual and automated effects of the system to allow the user to speed up and simplify a filmmaking process.

As an example, a user may login to the automatic animation program and connect to a user account by providing a username and password. The user may use a browser to login to the automatic animation program or the automatic animation program may be a native application executed by a client computing device. The client computing device may send a representation of the username and the password to the server computing device and the server computing device may authenticate the user based on the representation of the username and the password.

The user may select a user interface element to generate a "New Story." Next, the user may drag and drop characters into the character sheet, select locations, and may select an overall tone of the animation project. The user may drag and drop templates of shots into various acts, scenes, and subscenes. The user may choose to change or override shot information such as lighting, actors, and/or actions. The user may add music and/or sound effects to the timeline of the video. Next, the user may select a button or user interface element to create a movie or animation project. The user may view the progress of the rendering of the movie and receive a message such as an email or push notification from the server computing device that includes a link to the URL of the completed, rendered, file.

Subscene/Scene Template Examples may include:
TRAVELLING_SAFE
TRAVELLING_DANGER
1ON1_SWORDFIGHT
1ON1_GUNFIGHT
GROUP_SWORDFIGHT
GROUP_GUNFIGHT
SPACE_OR_AIR_DOGFIGHT
CONVERSATION_SPOOKY
CONVERSATION_PLEASANT
CONVERSATION_ROMANTIC
CONVERSATION_DANGEROUS Shot Template examples may include:
FOREGROUND_OBJECT_PANSHOT_SPIELBERG
SCARY_CHASE_CAM_GROUND_RAIMI
PANNING_CIRCLE_ACTOR_GROUP_WHEDON In one example, a system may include a memory storing computer-readable instructions and at least one processor to execute the instructions to receive a shot sheet comprising data and metadata associated with an animation project, parse the shot sheet to generate instructions associated with at least one shot in the animation project, send the instructions to an animation program using an application programming interface (API), generate the animation project based on the instructions using the animation program, render the animation project into a video, and store the video in a database and generate a uniform resource locator (URL) for the video.

FIG. 1 is a block diagram of an automatic animation system 100 according to an example of the instant disclosure. As shown in FIG. 1, the system 100 may include at least one client computing device 102 and at least one server computing device 104. The at least one server computing device 104 may be in communication with at least one database 110.

The client computing device 102 and the server computing device 104 may have an automatic animation application 106 that may be a component of an application and/or service executable by the at least one client computing device 102 and/or the server computing device 104. For example, the automatic animation application 106 may be a single unit of deployable executable code or a plurality of units of deployable executable code. According to one aspect, the automatic animation application 106 may include one component that may be a web application, a native application, and/or a mobile application (e.g., an app) downloaded from a digital distribution application platform that allows users to browse and download applications developed with mobile software development kits (SDKs) including the App Store and GOOGLE PLAY®, among others.

The automatic animation system 100 also may include a relational database management system (RDBMS), e.g., MySQL, or another type of database management system such as a NoSQL database system that stores and communicates data from at least one database 110. The data stored in the at least one database 110 may be associated with a plurality of animation projects including videos associated with each of the animation projects.

Individual pieces of data may be tagged with metadata that may allow them to be flexibly used by the shot sheet parser and the graphical user interface. The database 110 may have a plurality of different projects and each may be separate. As an example, the database 110 may include one or more tables such as a table associated with shot sheets, a table associated with animation projects, and a table associated with videos, among others.

The database 110 may have artificial intelligence (AI) information such as DeepMimic for animations, Photo Wake-Up for rigged objects and any other input that can be identified. The database 110 can also be populated by mass 'scraping' or dumping information into the database, such as thousands of rigged animations for use with meshes/objects provided by the Carnegie Mellon University Motion Capture database.

The at least one client computing device 102 and the at least one server computing device 104 may be configured to receive data from and/or transmit data through a communication network 108. Although the client computing device 102 and the server computing device 104 are shown as a single computing device, it is contemplated each computing device may include multiple computing devices or multiple virtual machines, or multiple containers, for example, in a cloud computing configuration.

The communication network 108 can be the Internet, an intranet, or another wired or wireless communication network. For example, the communication network may include a Mobile Communications (GSM) network, a code division multiple access (CDMA) network, $3^{rd}$ Generation Partnership Project (GPP) network, an Internet Protocol (IP) network, a wireless application protocol (WAP) network, a WiFi network, a Bluetooth network, a near field communication (NFC) network, a satellite communications network, or an IEEE 802.11 standards network, as well as various communications thereof. Other conventional and/or later developed wired and wireless networks may also be used.

The client computing device 102 may include at least one processor to process data and memory to store data. The processor processes communications, builds communications, retrieves data from memory, and stores data to memory. The processor and the memory are hardware. The memory may include volatile and/or non-volatile memory, e.g., a computer-readable storage medium such as a cache, random access memory (RAM), read only memory (ROM), flash memory, or other memory to store data and/or computer-readable executable instructions. In addition, the client computing device 102 further includes at least one communications interface to transmit and receive communications, messages, and/or signals.

The client computing device 102 could be a programmable logic controller, a programmable controller, a laptop computer, a smartphone, a personal digital assistant, a tablet computer, a standard personal computer, or another processing device. The client computing device 102 may include a display, such as a computer monitor, for displaying data and/or graphical user interfaces. The client computing device 102 may also include a Global Positioning System (GPS) hardware device for determining a particular location, an input device, such as one or more cameras or imaging devices, a keyboard or a pointing device (e.g., a mouse, trackball, pen, or touch screen) to enter data into or interact with graphical and/or other types of user interfaces. In an exemplary embodiment, the display and the input device may be incorporated together as a touch screen of the smartphone or tablet computer.

The server computing device 104 may include at least one processor to process data and memory to store data. The processor processes communications, builds communications, retrieves data from memory, and stores data to memory. The processor and the memory are hardware. The memory may include volatile and/or non-volatile memory, e.g., a computer-readable storage medium such as a cache, random access memory (RAM), read only memory (ROM), flash memory, or other memory to store data and/or computer-readable executable instructions. In addition, the server computing device 104 further includes at least one communications interface to transmit and receive communications, messages, and/or signals.

As an example, the client computing devices 102 and the server computing device 104 communicate data in packets, messages, or other communications using a common protocol, e.g., Hypertext Transfer Protocol (HTTP) and/or Hypertext Transfer Protocol Secure (HTTPS). The one or more computing devices may communicate based on representational state transfer (REST) and/or Simple Object Access Protocol (SOAP). As an example, a first computer (e.g., the client computing device 102) may send a request message that is a REST and/or a SOAP request formatted using Javascript Object Notation (JSON) and/or Extensible Markup Language (XML). In response to the request message, a second computer (e.g., the server computing device 104) may transmit a REST and/or SOAP response formatted using JSON and/or XML.

Figure 2:
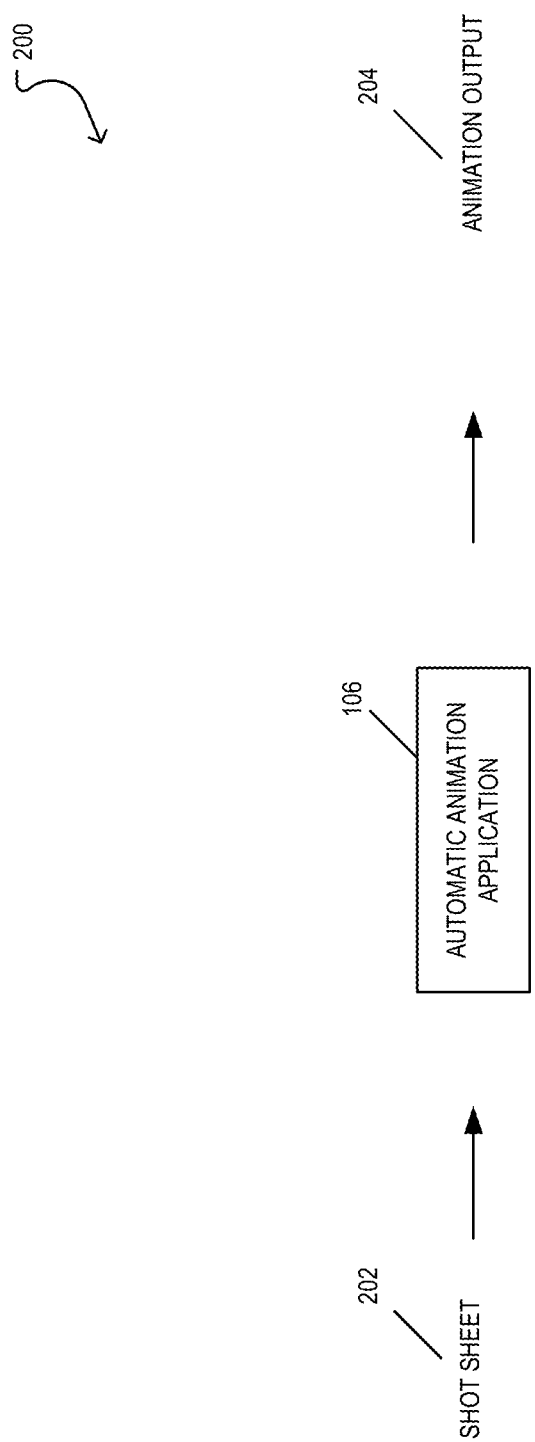
FIG. 2 is a flow diagram associated with generation of animation output by the automatic animation system according to an example of the instant disclosure.

FIG. 2 shows a flow diagram 200 associated with generation of animation output according to an example of the instant disclosure. As shown in FIG. 2, the server computing device 104 of the system 100 may receive a shot sheet 202 from a user. The shot sheet 202 or a representation of the shot sheet may be provided to the automatic animation application 106. The automatic animation application 106 may parse the shot sheet 202 and generate an animation output 204 or an animation project. The animation output 204 may be an animation file or a media file.

Figure 3:
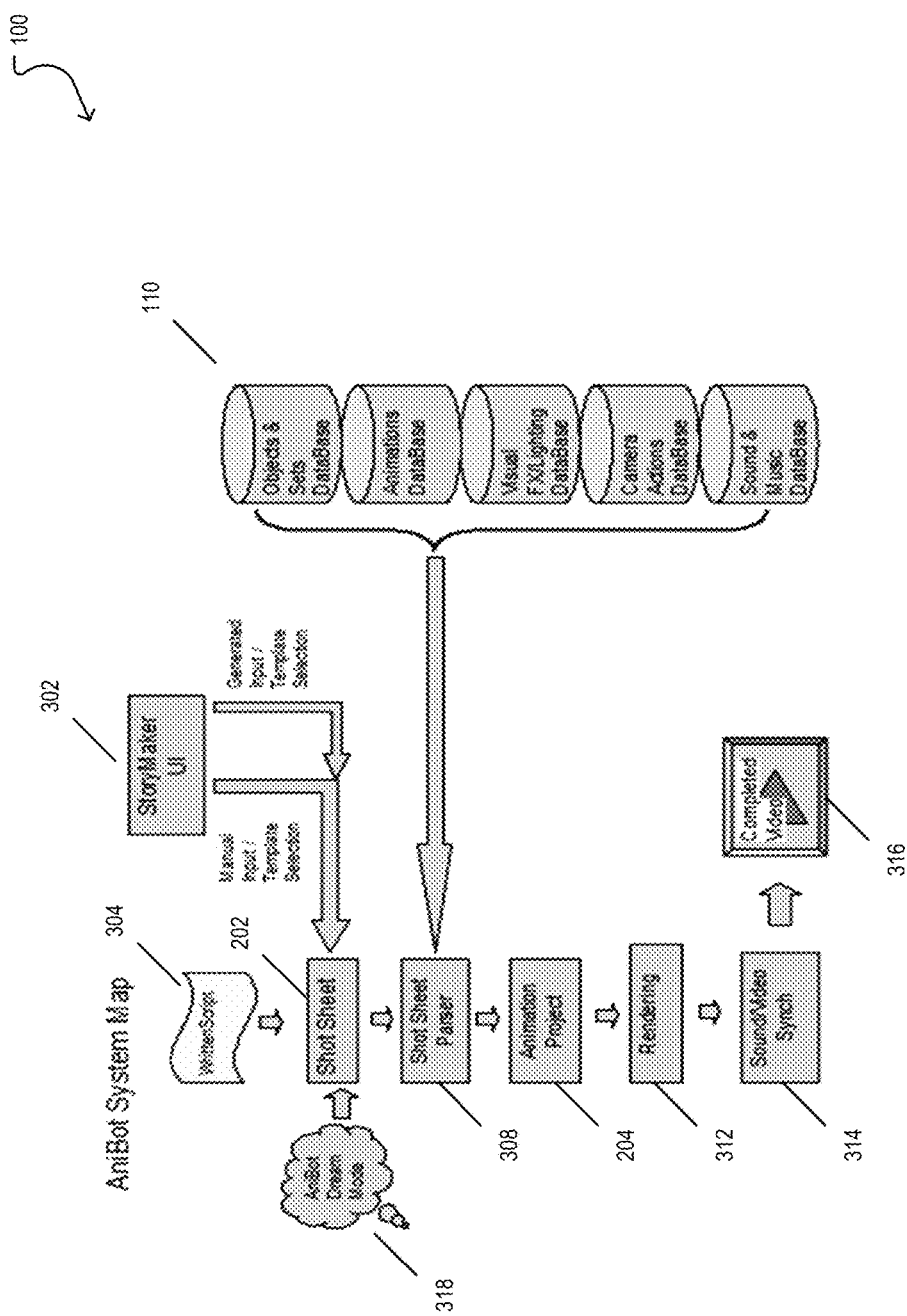
FIG. 3 is another block diagram of the automatic animation system to an example of the instant disclosure.

FIG. 3 shows a block diagram of the automatic animation system 100 according to an example of the instant disclosure. As shown in FIG. 3, a user of the client computing device 102 may use a graphical user interface (GUI) such as a StoryMaker UI 302. The user may utilize the StoryMaker UI 302 to create a shot sheet 202 based on manual input and template selection of one or more shots as well as generated input and template selection of one or more shots. Alternatively, a written script may be used to generate a shot sheet 202. In an even further example, the system may utilize dream mode to automatically generate a shot sheet 202.

Dream mode may utilize each object, animation, visual effect, shot template, and other information stored in the database 110 to autonomously generate an animation project 204. Currently, when the automatic animation program 106 is being executed by the server computing device 104 and there is ample available computational cycles, dream mode may create animation projects. The animation projects 204 may be randomly and autonomously generated by the server computing device 104. The dream mode can select a random assortment of objects, actions, settings, locations, mood, and music/sound effects based on artificial intelligence and deep learning. As an example, dream mode may combine the objects, actions, settings, locations, mood, and music/effects based on feedback provided from users. When the feedback is positive, the system may make similar animation projects based on the combinations in the animation project in the future. When the feedback is negative, the system may make changes and not use the combinations in the future.

Shot sheets 202 that are generated by a user of the automatic animation application 106 or that are generated by dream mode can be parsed by the shot parser 308.

The shot sheet parser 308 may receive the shot sheet 202 and parse the shot sheet 202 line by line to generate instructions. The shot sheet 202 may have a particular format, syntax, or organization that is interpreted by the shot sheet parser 308 to generate the instructions.

The instructions may be generated using the data in the database 110 including an objects/sets database, an animations database, a visual effects/lighting database, a camera actions database, and a sound/music database. The instructions may be source code or a script that may be used by an animation program. The animation program may be one or more of UNITY, UNREAL, BLENDER, and MAYA, among others. The animation program may receive the instructions that may be sent using one or more APIs and generate an animation project 204 based on the instructions. The animation project 204 may be saved as a file such as a .unity file or a .blend file. As an example, the API may be the Unity Scripting API, the Blender Python API, or others.

The animation application such as UNITY, UNREAL, BLENDER, and/or MAYA may be executed by the client computing device 102, the server computing device 104, and/or another computing device such as another server computing device.

After the animation project 204 is generated by the animation program, the animation program and/or another program may be used to perform rendering 312. After rendering 312, the automatic animation program 106 may be used to perform sound/video synchronization 314 and to generate a completed video 316 such as an H.264 file, and MPEG-4 file, a .MP4 file, or another type of file. The completed video may be stored in the database 110.

Figure 4:
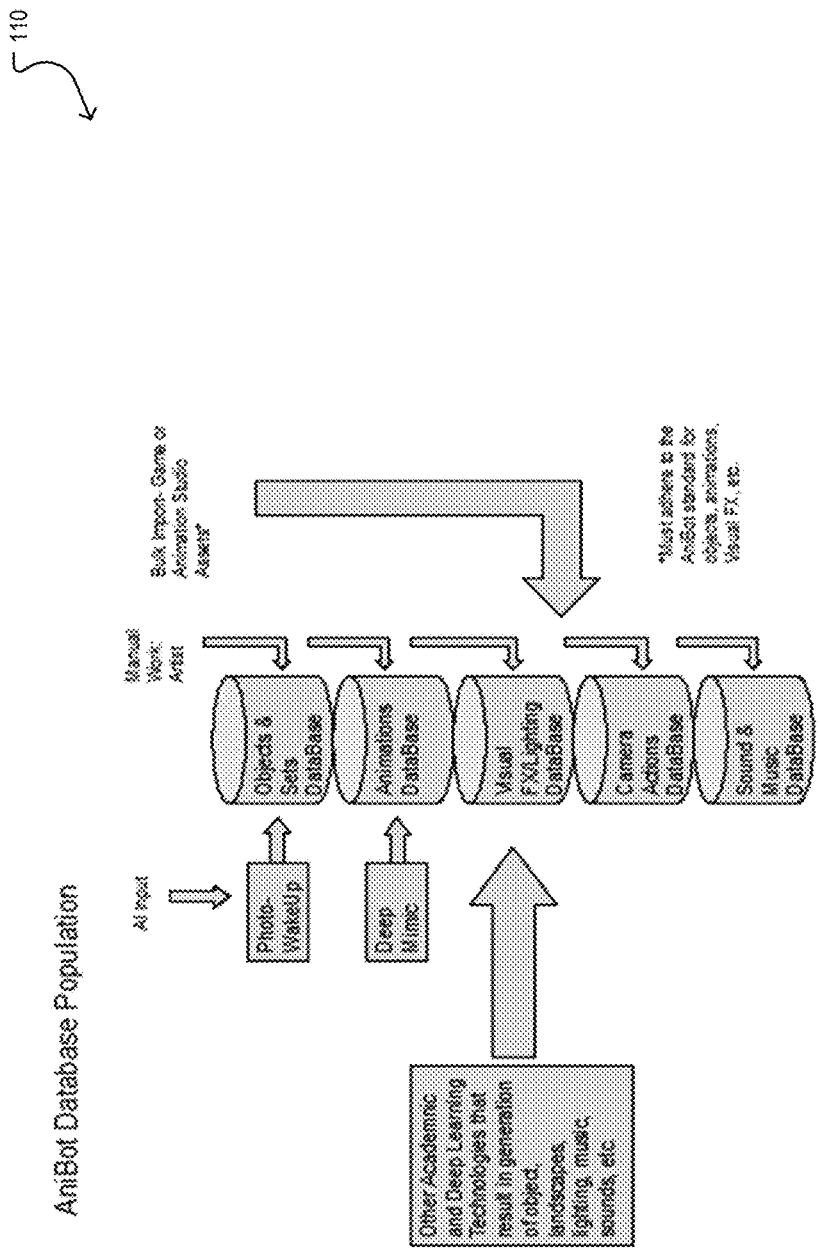
FIG. 4 is a diagram of a database associated with the automatic animation system according to an example of the instant disclosure.

FIG. 4 is a diagram of the database 110 associated with the automatic animation system 100 according to an example of the instant disclosure. As shown in FIG. 4, the database 110 may include AI input including Photo Wake-Up and DeepMimic information. The database 110 may have one or more databases that may be populated with artist created data and assets and/or assets that may be imported from other locations and sources including an objects and sets database, an animations database, a visual effects (FX)/lighting database, a camera actions database, and a sound/music database. These databases may be populated using imported information from game and/or animation studio assets. In addition, they may include information that may be generated manually by artists. Even further, the databases may include other academic and deep learning technologies that may result in generation of objects, landscapes, lighting, music, sounds, and others.

In one example, each movie, media, or game studio may have a securely walled or divided section of the database 110 to store associated animation projects 204 as well as animation project assets. As an example, a first studio may have one or more animation projects 204 stored in a first section of the database 110 and a second studio may have one or more animation projects 204 stored in a second section of the database 110. Additionally, the first studio may have a first sub-section of the first section of the database for a first game, movie, media project, or team and a second sub-section of the first section of the database for a second game, movie, media project, or team.

The objects and sets database may include a plurality of objects and files that may be used by each of the animation software programs. As an example, they may be static files that may be associated with a spaceship, a tree, or a nineteenth century mansion, among others. Each object is to adhere to system object standards. As an example, each object is to be scaled initially to real world proportions, face a certain direction, have a starting position, and have parts that may be named according to a set of standards. As an example, they may have tags including "head", "left eye", "arm", "leg", "windshield", "rotor", and others. The objects may each have one or more tags that may inform the system how they may operate, what they represent, and others. A helicopter may be tagged as a "helicopter." Optionally, an object may be tagged to fit certain locations, set layouts, and others that may correspond to the shot sheet. If an object is a pine tree, and it is tagged "coniferous forest", and a shot sheet location is "coniferous forest", this may allow the shot sheet parser to intelligently place objects in the foreground or background of a shot and build sets dynamically. A stop sign may be tagged with several tags including "modern city", "suburb street", and others. This may prevent the stop sign from being used in a medieval village location.

The animations database can be used to animate using keyframes or keyframe positions that may affect rigging.

Rigging can be standardized to a system standard to be useful procedurally. Without tags and standards, the animations may be used, especially if a mesh or a 3D object is attached to the animation. Animations may have keyframe data attached to them. In order to have animations be useful and powerful, they can be used by rigs without models that may allow them to be applied to any model/mesh.

The visual effects database may include data that may generally affect other objects and may have keyframe information. There may be particle effects with a variety of information that the animation software may be able to utilize and understand. In addition, the visual effects database may include code/scripts that may be used dynamically by the system to achieve a variety of effects. As an example, a script associated with fire may have various variables that can be included in a shot sheet or generated/randomized/affected using shot sheet information.

The camera actions database may include camera movements that may be used in a shot sheet to control tracking, movement, and other aspects of one or more cameras. A camera may be a special object within animation software that may have unique variables and keyframes that may be used by the animation software.

The sound/music database may have a plurality of sound files including sonatas, ambient tagged music, or sound effects such as "Danger", "Win Fight", "Lose Fight", "Travel", a gunshot, an axe impact, and others. The files can be used in the animation project 204 and in the post-rendering sound synchronization.

Figure 5:
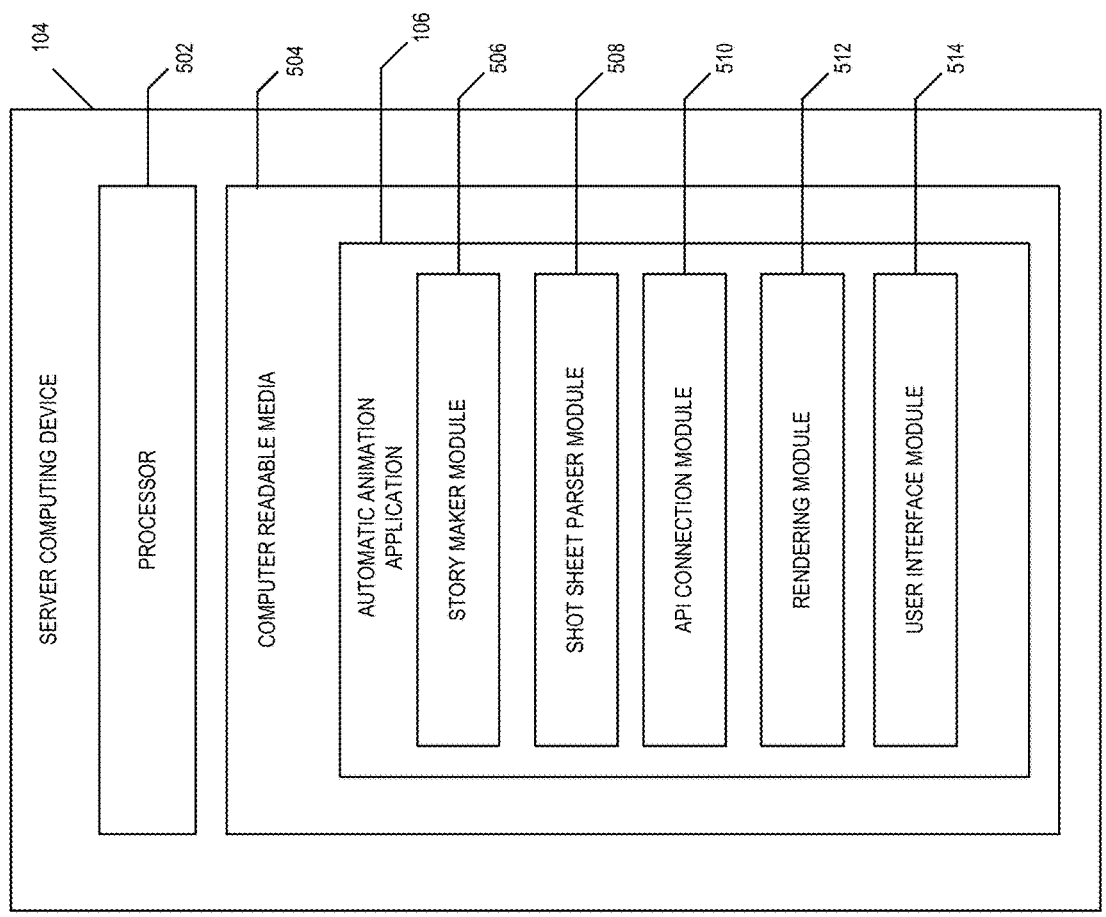
FIG. 5 shows a block diagram of an automatic animation application of the automatic animation system according to an example of the instant disclosure.

FIG. 5 shows a block diagram of the server computing device 104 of the automatic animation system 100 according to an example of the instant disclosure.

The server computing device 104 includes computer readable media (CRM) 504 in memory on which the automatic animation application 106 is stored. The computer readable media 504 may include volatile media, nonvolatile media, removable media, non-removable media, and/or another available medium that can be accessed by the processor 502. By way of example and not limitation, the computer readable media 504 comprises computer storage media and communication media. Computer storage media includes non-transitory storage memory, volatile media, nonvolatile media, removable media, and/or non-removable media implemented in a method or technology for storage of information, such as computer/machine-readable/executable instructions, data structures, program modules, or other data. Communication media may embody computer/machine-readable/executable instructions, data structures, program modules, or other data and include an information delivery media or system, both of which are hardware.

The automatic animation application 106 may include a story maker module 506. The story maker module 506 may provide a user of the client computing device 102 an interface that may allow the user to generate a shot sheet 202. The story maker module 506 may have a graphical user interface (GUI) or another type of interface that may allow the user to create a shot sheet 202.

In one example, the user may use the story maker module 506 to generate a shot sheet 202 that includes one or more acts, one or more scenes, one or more subscenes, and one or more shots. The user may use the story maker module 506 to insert the one or more shots into each of the scenes and/or subscenes and add objects and modify variables that may be associated with the shots. For example, the user can insert characters or cast, modify weather, modify mood, modify one or more cameras as well as change their position, change a time of day, add dialog, modify energy, and others.

The automatic animation application 106 may include a shot sheet parser module 508. As an example, the shot sheet parser module 508 may receive a shot sheet 202 that may be manually created or written by a user, generated using the story maker module 506, or even generated based on a screenplay and NPL. As noted herein, the shot sheet 202 may have a particular format, organization, and/or syntax that may allow the shot sheet parser module 508 to parse the shot sheet. The shot sheet parser 508 may go through the shot sheet 202 one line at a time and generate corresponding instructions for one or more animation applications. The shot sheet parser 508 recognizes objects and animations in the shot sheet 202, tags the objects and animations with categories, and is used to generate corresponding instructions for a particular animation application.

Each animation application may be different and the instructions will be customized for a particular animation application. As an example, if a first animation application is to be used, the shot sheet 202 may be parsed by the shot sheet parser 508 to generate instructions that may include one, two, three. However, if a second animation application is to be used, the shot sheet 202 may be parsed by the shot sheet parser 508 to generate instructions that may include a, b, and c. The instructions one, two, and three may be similar but different from a, b, and c. In addition, the instructions may accomplish and execute similar functions in the different animation applications.

The automatic animation application 106 may include an API connection module 510. The API connection module 510 may be used to transmit or send the instructions to the appropriate animation application using the appropriate API. As an example, the first animation application may use a first API and the second animation application may use a second API. The animation application may receive the instructions and interpret the instructions and/or compile the instructions.

The automatic animation application 106 may include a rendering module 512. As an example, the rendering module 512 may be used to render the animation associated with the animation project 204 by logically ordering and combining the one or more shots into a single unified project and also may be used to synchronize audio including music/sound effects with the video aspects of the animation project 204. The rendering module 512 receives the video and audio aspects of the animation project 204 from the animation application and may generate a completed video file. The video file may be stored in the database and may have a unique uniform resource locator (URL) to may be used to retrieve and view the video file.

The automatic animation application 106 may include a user interface module 514. The user interface module 514 receives requests or other communications from the client computing device 102 and transmits a representation of requested information, user interface elements, and other data and communications to the client computing device 102 for display on the display. As an example, the user interface module 514 generates a native and/or web-based graphical user interface (GUI) that accepts input and provides output by generating content that is transmitted via the communications network 108 and viewed by a user of the client computing device 102. The user interface module 514 may provide realtime automatically and dynamically refreshed information to the user of the client computing device 102 using Java, Javascript, AJAX (Asynchronous Javascript and XML), ASP.NET, Microsoft .NET, and/or node.js, among others. The user interface module 514 may send data to other modules of the automatic animation application 106 of the server computing device 104, and retrieve data from other modules of the automatic animation application 106 of the server computing device 104 asynchronously without interfering with the display and behavior of the client computing device 102.

Figure 6:
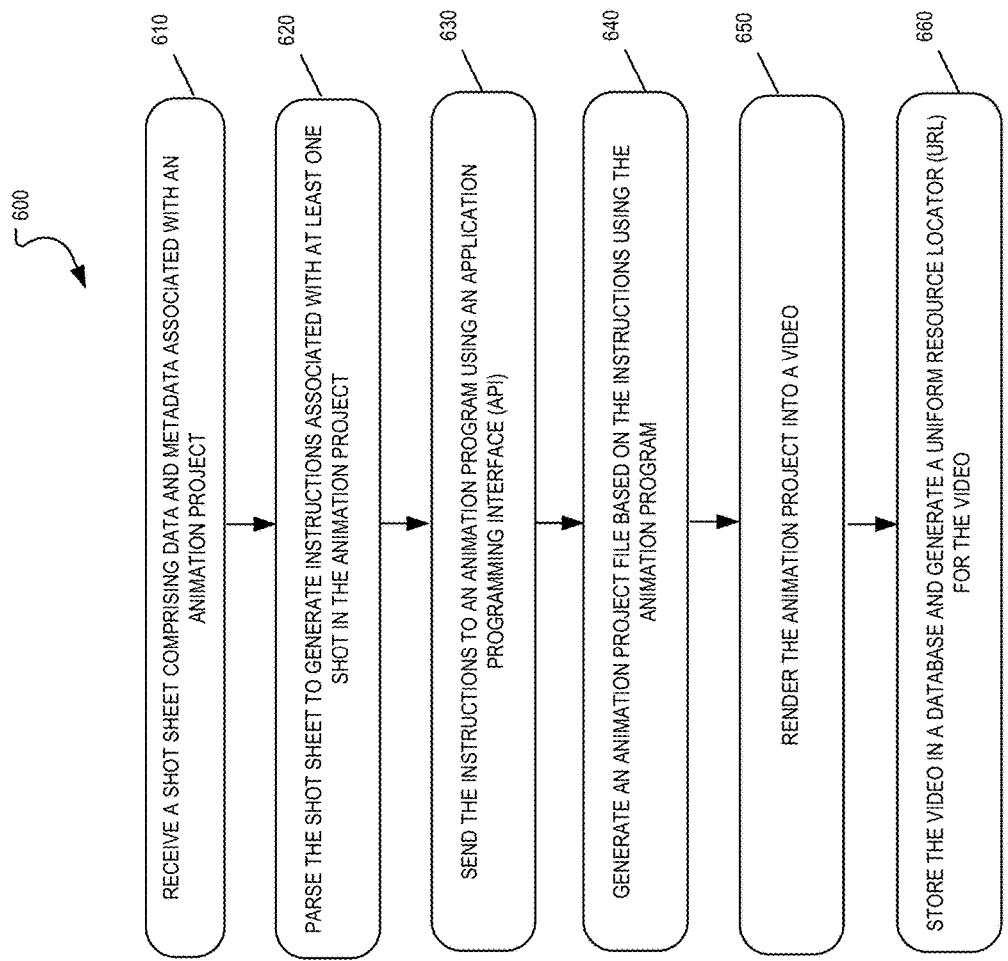
FIG. 6 shows a flowchart of a process performed by the automatic animation application according to an example of the instant disclosure.

FIG. 6 illustrates an example method 600 of generating an animation project 204 by the automatic animation system 100 according to an example of the instant disclosure. Although the example method 600 depicts a particular sequence of operations, the sequence may be altered without departing from the scope of the present disclosure. For example, some of the operations depicted may be performed in parallel or in a different sequence that does not materially affect the function of the method 600. In other examples, different components of an example device or system that implements the method 600 may perform functions at substantially the same time or in a specific sequence.

According to some examples, the method 600 may include receiving a shot sheet 202 comprising data and metadata associated with an animation project 204 at block 610. The shot sheet 202 may be a comma separated values file or a spreadsheet file such as an .xls file. The shot sheet 202 may include a number of lines that may define a title of the animation project, settings associated with the project such as animation software to be used with the shot sheet, a cast list including one or more characters, one or more acts and associated metadata, one or more scenes, and one or more subscenes. Each act may include one or more shots that may have a particular length, a title, a set layout, camera information, and other information. In addition, each act may have a length, a mood, and a tone. Each scene may have a mood, a tone, a location, a time of day, weather information, energy information, and other information. The scenes may inherit characteristics or variables from a corresponding act and subscenes also may inherit characteristics or variables from a corresponding scene.

Next, according to some examples, the method 600 may include parsing the shot sheet 202 to generate instructions associated with the at least one shot in the animation project 204 at block 620. As noted above, the parsing of the shot sheet 202 is based on the particular animation software. In one example, the instructions for the same shot sheet may include one, two, three for a first animation program and the instructions may be a, b, and c for a second animation program.

Next, according to some examples, the method 600 may include sending the instructions to an animation program using an application programming interface (API) at block 630. The instructions may be sent using a first API for the first animation program and may be sent using a second API using a second animation program.

Next, according to some examples, the method 600 may include generating an animation project file using the animation program based on the instructions at block 640. As an example, the animation project file may be a .blend file or another type of animation project file.

Next, according to some examples, the method 600 may include rendering the animation project 204 into a video file or animation output 204 at block 650. This may include combining all of the shots in each of the scenes, subscenes, and acts into a single project or video file in sequential or logical order. As this process is in progress, the user may view a current percentage of the status of the rendering. This information along with other information about the rendering process may be displayed on the display of the client computing device 102. The rendering may include synchronizing audio including music and sound effects with video associated with the animation project 204 to generate the video file.

Next, according to some examples, the method 600 may include storing the video file in the database 110 and generating a uniform resource locator (URL) for the video file at block 660.

According to some examples, the method 600 may include generating a first set of instructions for a first animation program and generating a second set of instructions for a second animation program. In some examples, the instructions may include a python script to be interpreted by the animation program.

According to some examples, the method 600 may include receiving input from a user using a graphical user interface (GUI) to create the shot sheet 202, the user dragging and dropping at least one shot sheet template into the shot sheet. The user may use the client computing device 102 to provide the input.

According to some examples, the method 600 may include automatically generating the shot sheet 202 by randomizing objects, actions, settings, locations, moods, and music associated with the data and the metadata in the shot sheet. In some examples, the shot sheet is autonomously generated using deep learning using dream mode.

Figure 7:
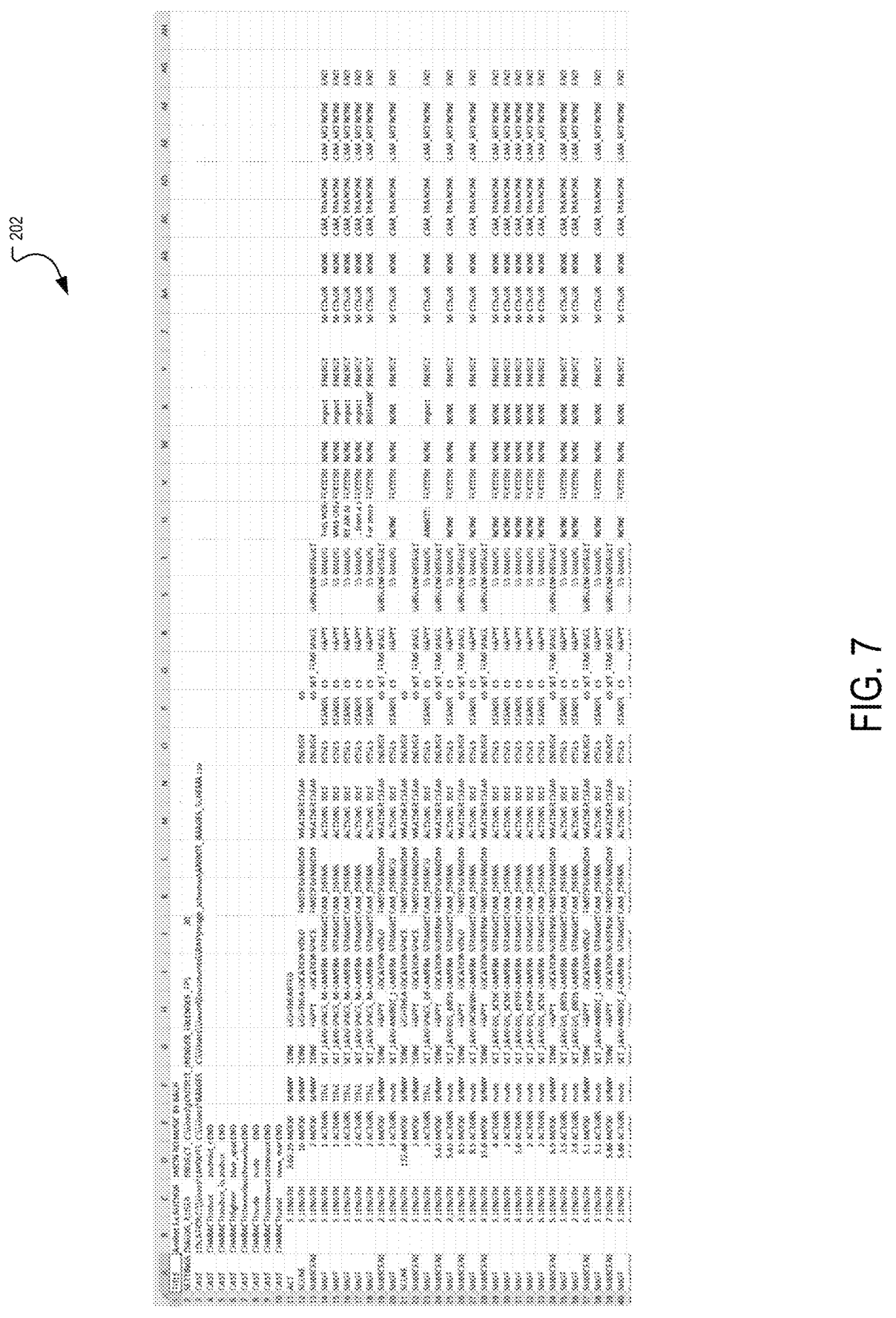

FIG. 7 shows an example of a shot sheet 202 in a spreadsheet file according to an example of the instant disclosure. As shown in FIG. 7, the shot sheet shows a number of lines including the first forty lines of the shot sheet 202.

In particular, line one shows a title, line two shows settings information, lines three through ten show cast information, line eleven shows act one information, line twelve shows scene information, line thirteen shows subscene information, lines fourteen through eighteen show shot information, line nineteen shows subscene information, line twenty shows shot information, line twenty-one shows scene information, and so on. As noted herein, the shot sheet may have a particular organization, format, or syntax so that the shot sheet parser is able to parse each line.

Figure 8:
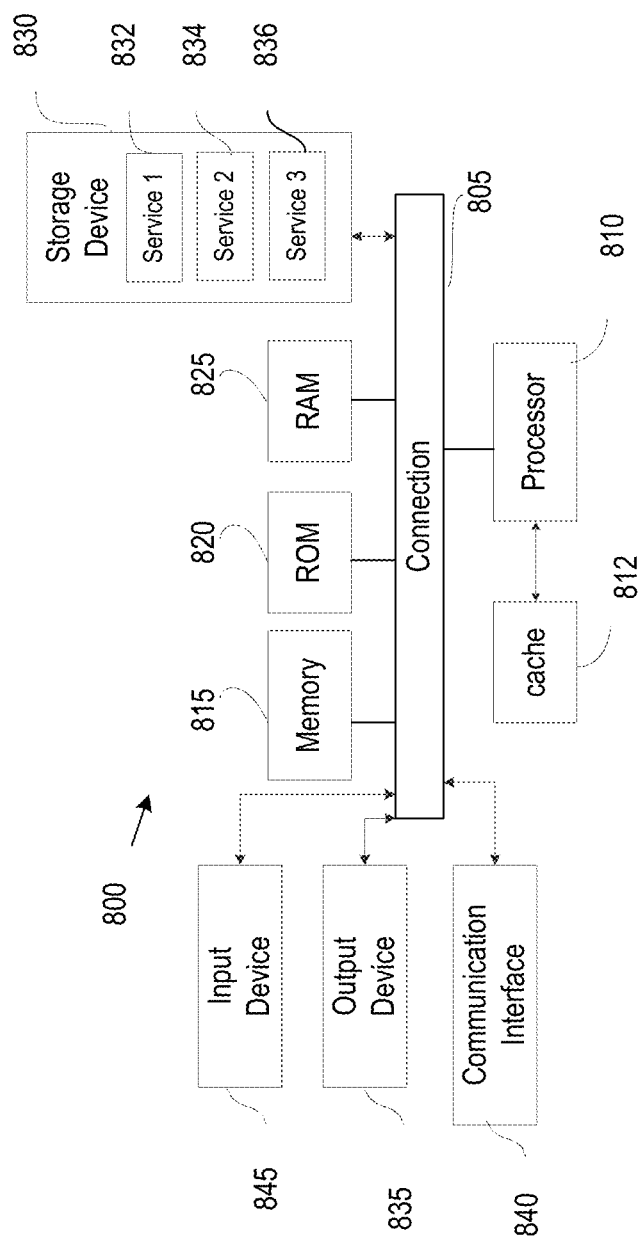
FIG. 8 shows an example of a system for implementing certain aspects of the present technology.

FIG. 8 shows an example of computing system 800, which can be for example any computing device making up the computing device such as the client computing device 102, the server computing device 104, or any component thereof in which the components of the system are in communication with each other using connection 805. Connection 805 can be a physical connection via a bus, or a direct connection into processor 810, such as in a chipset architecture. Connection 805 can also be a virtual connection, networked connection, or logical connection.

In some embodiments, computing system 800 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 800 includes at least one processing unit (CPU or processor) 810 and connection 805 that couples various system components including system memory 815, such as read-only memory (ROM) 820 and random access memory (RAM) 825 to processor 810. Computing system 800 can include a cache of high-speed memory 812 connected directly with, in close proximity to, or integrated as part of processor 810.

Processor 810 can include any general purpose processor and a hardware service or software service, such as services 832, 834, and 836 stored in storage device 830, configured to control processor 810 as well as a special-purpose processor where software instructions are incorporated into the actual processor design. Processor 810 may essentially be a completely self-contained computing system, containing multiple cores or processors, a bus, memory controller, cache, etc. A multi-core processor may be symmetric or asymmetric.

To enable user interaction, computing system 800 includes an input device 845, which can represent any number of input mechanisms, such as a microphone for speech, a touch-sensitive screen for gesture or graphical input, keyboard, mouse, motion input, speech, etc. Computing system 800 can also include output device 835, which can be one or more of a number of output mechanisms known to those of skill in the art. In some instances, multimodal systems can enable a user to provide multiple types of input/output to communicate with computing system 800. Computing system 800 can include communications interface 840, which can generally govern and manage the user input and system output. There is no restriction on operating on any particular hardware arrangement, and therefore the basic features here may easily be substituted for improved hardware or firmware arrangements as they are developed.

Storage device 830 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read-only memory (ROM), and/or some combination of these devices.

The storage device 830 can include software services, servers, services, etc., that when the code that defines such software is executed by the processor 810, it causes the system to perform a function. In some embodiments, a hardware service that performs a particular function can include the software component stored in a computer-readable medium in connection with the necessary hardware components, such as processor 810, connection 805, output device 835, etc., to carry out the function.

For clarity of explanation, in some instances, the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program or a collection of programs that carry out a specific function. In some embodiments, a service can be considered a server. The memory can be a non-transitory computer-readable medium.

In some embodiments, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer-readable media. Such instructions can comprise, for example, instructions and data which cause or otherwise configure a general purpose computer, special purpose computer, or special purpose processing device to perform a certain function or group of functions. Portions of computer resources used can be accessible over a network. The executable computer instructions may be, for example, binaries, intermediate format instructions such as assembly language, firmware, or source code. Examples of computer-readable media that may be used to store instructions, information used, and/or information created during methods according to described examples include magnetic or optical disks, solid-state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smartphones, small form factor personal computers, personal digital assistants, and so on. The functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Illustrative examples of the disclosure include:

Aspect 1: A system comprising: a memory storing computer-readable instructions; and at least one processor to execute the instructions to receive a shot sheet comprising data and metadata associated with an animation project, parse the shot sheet to generate instructions associated with at least one shot in the animation project, send the instructions to an animation program using an application programming interface (API), generate the animation project based on the instructions using the animation program, render the animation project into a video, and store the video in a database and generate a uniform resource locator (URL) for the video.

Aspect 2: The system of Aspect 1, the at least one processor further to generate a first set of instructions for a first animation program and generate a second set of instructions for a second animation program.

Aspect 3: The system of Aspects 1 and 2, the at least one processor further to receive input from a user using a graphical user interface (GUI) to create the shot sheet, the user dragging and dropping at least one shot sheet template into the shot sheet.

Aspect 4: The system of Aspects 1 to 3, wherein the shot sheet comprises data and metadata associated with at least one act, at least one scene, at least one subscene, and at least one shot.

Aspect 5: The system of Aspects 1 to 4, wherein the shot sheet comprises one of a comma separated values file and a spreadsheet file.

Aspect 6: The system of Aspects 1 to 5, the at least one processor further to automatically generate the shot sheet by randomizing objects, actions, settings, locations, moods, and music associated with the data and the metadata in the shot sheet.

Aspect 7: The system of Aspects 1 to 6, wherein the shot sheet is autonomously generated using deep learning.

Aspect 8: The system of Aspects 1 to 7, wherein the instructions comprise a python script to be interpreted by the animation program.

Aspect 9: A method comprising receiving, by at least one processor, a shot sheet comprising data and metadata associated with an animation project, parsing, by the at least one processor, the shot sheet to generate instructions associated with at least one shot in the animation project, sending, by the at least one processor, the instructions to an animation program using an application programming interface (API), generating, by the at least one processor, the animation project based on the instructions using the animation program, rendering, by the at least one processor, the animation project into a video, and storing, by the at least one processor, the video in a database and generating a uniform resource locator (URL) for the video.

Aspect 10: The method of Aspect 9, further comprising generating a first set of instructions for a first animation program and generating a second set of instructions for a second animation program.

Aspect 11: The method of Aspects 9 and 10, further comprising receiving input from a user using a graphical user interface (GUI) to create the shot sheet, the user dragging and dropping at least one shot sheet template into the shot sheet.

Aspect 12: The method of Aspects 9 to 11, wherein the shot sheet comprises data and metadata associated with at least one act, at least one scene, at least one subscene, and at least one shot.

Aspect 13: The method of Aspects 9 to 12, wherein the shot sheet comprises one of a comma separated values file and a spreadsheet file.

Aspect 14: The method of Aspects 9 to 13, further comprising automatically generating the shot sheet by randomizing objects, actions, settings, locations, moods, and music associated with the data and the metadata in the shot sheet.

Aspect 15: The method of Aspects 9 to 14, wherein the shot sheet is autonomously generated using deep learning.

Aspect 16: The method of Aspects 9 to 15, wherein the instructions comprise a python script to be interpreted by the animation program.

Aspect 17: A non-transitory computer-readable storage medium, having instructions stored thereon that, when executed by a computing device cause the computing device to perform operations, the operations comprising receiving a shot sheet comprising data and metadata associated with an animation project, parsing the shot sheet to generate instructions associated with at least one shot in the animation project, sending the instructions to an animation program using an application programming interface (API), generating the animation project based on the instructions using the animation program, rendering the animation project into a video, and storing the video in a database and generating a uniform resource locator (URL) for the video.

Aspect 18: The non-transitory computer-readable storage medium of Aspect 17, the operations further comprising generating a first set of instructions for a first animation program and generating a second set of instructions for a second animation program.

Aspect 19: The non-transitory computer-readable storage medium of Aspects 17 and 18, the operations further comprising receiving input from a user using a graphical user interface (GUI) to create the shot sheet, the user dragging and dropping at least one shot sheet template into the shot sheet.

Aspect 20: The non-transitory computer-readable storage medium of Aspects 17 to 19, wherein the shot sheet comprises data and metadata associated with at least one act, at least one scene, at least one subscene, and at least one shot.

Aspect 21: The non-transitory computer-readable storage medium of Aspects 17 to 20, wherein the shot sheet comprises one of a comma separated values file and a spreadsheet file.

Aspect 22: The non-transitory computer-readable storage medium of Aspects 17 to 21, the operations further comprising automatically generating the shot sheet by randomizing objects, actions, settings, locations, moods, and music associated with the data and the metadata in the shot sheet.

Aspect 23: The non-transitory computer-readable storage medium of Aspects 17 to 22, wherein the shot sheet is autonomously generated using deep learning.

Aspect 24: The non-transitory computer-readable storage medium of Aspects 17 to 23, wherein the instructions comprise a python script to be interpreted by the animation program.

What is claimed is:

1. A system comprising:
   a memory storing computer-readable instructions; and
   at least one processor to execute the instructions to:
   receive input from a user using a graphical user interface (GUI) to create a shot sheet, the user dragging and dropping at least one shot sheet template into the shot sheet, the shot sheet autonomously generated using deep learning;
   receive the shot sheet comprising data and metadata associated with an animation project;
   parse the shot sheet to generate instructions associated with at least one shot in the animation project;
   send the instructions to an animation program using an application programming interface (API);
   generate the animation project based on the instructions using the animation program;
   render the animation project into a video; and
   store the video in a database and generate a uniform resource locator (URL) for the video.

2. The system of claim 1, the at least one processor further to generate a first set of instructions for a first animation program and generate a second set of instructions for a second animation program.

3. The system of claim 1, wherein the shot sheet comprises data and metadata associated with at least one act, at least one scene, at least one subscene, and at least one shot.

4. The system of claim 1, wherein the shot sheet comprises one of a comma separated values file and a spreadsheet file.

5. The system of claim 1, the at least one processor further to automatically generate the shot sheet by randomizing objects, actions, settings, locations, moods, and music associated with the data and the metadata in the shot sheet.

6. The system of claim 1, wherein the instructions comprise a python script to be interpreted by the animation program.

7. A method, comprising:
   receiving, by at least one processor, input from a user using a graphical user interface (GUI) to create a shot sheet, the user dragging and dropping at least one shot sheet template into the shot sheet, the shot sheet autonomously generated using deep learning;

receiving, by the at least one processor, the shot sheet comprising data and metadata associated with an animation project;

parsing, by the at least one processor, the shot sheet to generate instructions associated with at least one shot in the animation project;

sending, by the at least one processor, the instructions to an animation program using an application programming interface (API);

generating, by the at least one processor, the animation project based on the instructions using the animation program;

rendering, by the at least one processor, the animation project into a video; and storing, by the at least one processor, the video in a database and generating a uniform resource locator (URL) for the video.

8. The method of claim 7, further comprising generating a first set of instructions for a first animation program and generating a second set of instructions for a second animation program.

9. The method of claim 7, wherein the shot sheet comprises data and metadata associated with at least one act, at least one scene, at least one subscene, and at least one shot.

10. The method of claim 7, wherein the shot sheet comprises one of a comma separated values file and a spreadsheet file.

11. The method of claim 7, further comprising automatically generating the shot sheet by randomizing objects, actions, settings, locations, moods, and music associated with the data and the metadata in the shot sheet.

12. The method of claim 7, wherein the instructions comprise a python script to be interpreted by the animation program.

13. A non-transitory computer-readable storage medium, having instructions stored thereon that, when executed by a computing device cause the computing device to perform operations, the operations comprising:

receiving input from a user using a graphical user interface (GUI) to create a shot sheet, the user dragging and dropping at least one shot sheet template into the shot sheet, the shot sheet autonomously generated using deep learning;

receiving the shot sheet comprising data and metadata associated with an animation project;

parsing the shot sheet to generate instructions associated with at least one shot in the animation project;

sending the instructions to an animation program using an application programming interface (API);

generating the animation project based on the instructions using the animation program;

rendering the animation project into a video; and storing the video in a database and generating a uniform resource locator (URL) for the video.

14. The non-transitory computer-readable medium of claim 13, the operations further comprising generating a first set of instructions for a first animation program and generating a second set of instructions for a second animation program.

15. The non-transitory computer-readable medium of claim 13, wherein the shot sheet comprises data and metadata associated with at least one act, at least one scene, at least one subscene, and at least one shot.

16. The non-transitory computer-readable medium of claim 13, wherein the shot sheet comprises one of a comma separated values file and a spreadsheet file.

17. The non-transitory computer-readable medium of claim 13, the operations further comprising automatically generating the shot sheet by randomizing objects, actions, settings, locations, moods, and music associated with the data and the metadata in the shot sheet.

18. The non-transitory computer-readable medium of claim 13, wherein the instructions comprise a python script to be interpreted by the animation program.

* * * * *